Sept. 11, 1956    J. W. POMAZAL ET AL    2,762,988
MAGNETIC CORE ASSEMBLY
Filed May 25, 1951
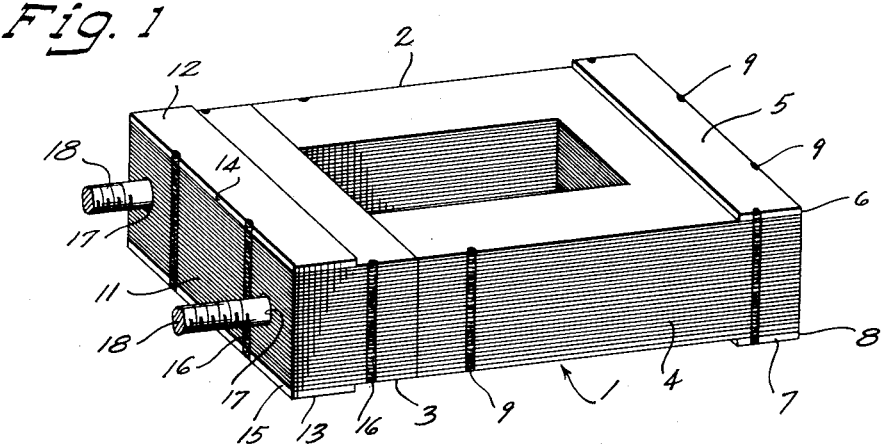
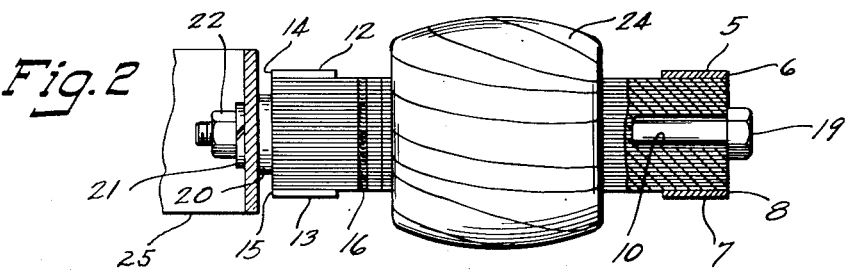
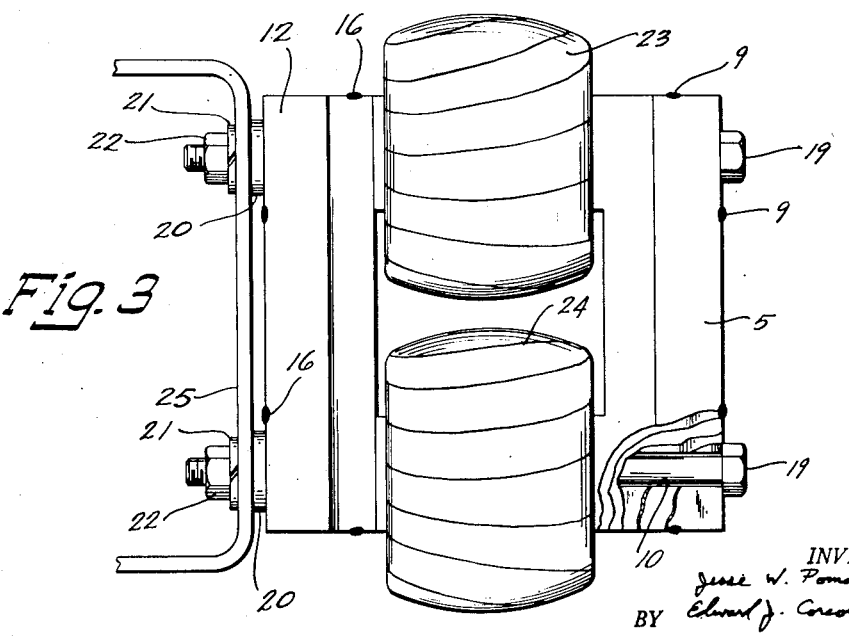
INVENTORS
Jesse W. Pomazal
Edward J. Corcoran
BY
Arthur H. Seidel
Attorney

United States Patent Office 2,762,988
Patented Sept. 11, 1956

2,762,988

MAGNETIC CORE ASSEMBLY

Jesse W. Pomazal and Edward J. Corcoran, Escanaba, Mich., assignors to Harnischfeger Corporation, Milwaukee, Wis., a corporation of Wisconsin Application May 25, 1951, Serial No. 228,226

1 Claim. (Cl. 336—210)

This invention relates to magnetic structures and more particularly to cores or frames of magnetic material composed of stacked laminations that form a magnetic flux path and that are adapted to receive in linked relation therewith electrical coils and it more specifically resides in a core or frame comprised of a number of segments that are each in turn comprised of a plurality of laminations secured to one another in stacked relation, which segments are positioned with respect to one another to form a magnetic flux path and are held and maintained in the spaced relation forming the magnetic flux path by clamping elements received by and passing through openings within the segments that extend substantially parallel to the run of the laminations and that are aligned with respect to one another to receive the clamping elements.

In the usual laminated core structure for transformers and other inductor reactor type apparatus a number of laminations are required to form a single layer. This is necessary in order to facilitate interlinkage of the core with coils that are wound prior to and in an operation separate from the assembly of the core and the coils. It is the usual practice to place the abutting edges of the laminations within an individual layer in staggered relation to the abutting edges of the laminations in adjacent layers so as to form a lapped construction at the lamination joints. This lapped type construction serves to retain the reluctance of the core at a minimum and also provides an amount of rigidity to the core. A core of this type is usually built up within finished coils and clamping means that comprise multiple bracket parts and attendant fittings envelope portions of the core to retain the laminations in a tightly compressed rigid position and to serve as a means for mounting the complete apparatus.

Some laminated cores have been constructed with butt type joints instead of the lap type construction, wherein the meeting edges of the laminations within a layer are aligned with like edges of the other layers. This construction is permissible when the increased eddy-currents at the joints and the increase in reluctance are not objectionable. It is a type of construction that is advantageous in the ease in which the assembly with coils is made. However, whether this or the lap type construction is used brackets with multiple fittings have been employed to either hold the laminations in place or to mount the magnetic core.

It is an object of this invention to simplify mounting brackets and attendant fittings that have heretofore been utilized for magnetic core structures.

It is another object of this invention to provide a magnetic core structure that comprises a number of segments which may be readily removed from one another to provide a rapid and easy insertion and removal of coils without a bracket structure being required to maintain the segments in position.

It is still another object of this invention to maintain sectors of a magnetic core structure in relation to one another by means of clamping means passing through openings within the core segments which are parallel to the run of the laminations.

In the description to follow reference is made to the accompanying drawing, which forms a part hereof, and in which there is shown by way of illustration and not of limitation one embodiment of this invention.

In the drawing:

Fig. 1 is a view in perspective of a magnetic core structure embodying this invention, Fig. 2 is a side view in elevation with parts broken away and in section of the core structure shown in Fig. 1 in mounted position and carrying transformer coils, and Fig. 3 is a plan view with parts broken away of the core structure shown in Fig. 2.

Referring now to the drawing, there is shown in Fig. 1 a magnetic core generally designated by the numeral 1 which is composed of two primary segments, a core body 2 and a yoke 3. The core body 2 is composed of a plurality of roughly horseshoe shaped laminations 4 that have uniform dimensions and that are stacked evenly one upon the other to give the core body 2 relatively smooth side faces.

Resting upon the top of the stacked laminations 4 is a brace bar 5 having an edge 6 adjacent the transverse edge of the uppermost lamination 4. A similar brace bar 7 is placed adjacent the lowermost lamination 4 with an edge 8 thereof adjacent the transverse edge of the lower lamination 4. To secure each of the laminations 4 to adjacent laminations 4 and to secure the brace bars 5 and 7 to the uppermost and lowermost laminations 4 a plurality of spaced fused metal bead welds 9 are formed transversely to the edges of the laminations 4 and the braces 5 and 7 on the outer faces of the core body 2 only. To complete the core body 2 two openings 10 extending parallel to the planes of the laminations 4 are medially disposed within the leg portions thereof.

The yoke 3 of the core 1 is constructed similarly as the core body 2. A plurality of uniform rectangularly shaped laminations 11 evenly stacked one upon the other form the yoke 3 so as to bridge the two ends of the core body 2. A brace bar 12 is placed adjacent the uppermost lamination 11 and a second brace bar 13 is placed adjacent the lowermost lamination 11. Edge 14 of brace 12 and edge 15 of brace 13 are each adjacent an edge of the particular lamination 11 adjacent thereto. A spaced plurality of transverse welds 16, similar to the welds 9, hold and position the laminations 11 and brace bars 12 and 13 in fixed relation to one another. The yoke 3 has a pair of openings 17 extending therethrough parallel to the planes of the laminations 11 which are spaced so as to be aligned with the openings 10 in the core body 2.

Received by and passing through the aligned openings 10 and 17 are a pair of clamping members 18 the surfaces of which are spaced from the portions of the laminations 4 and 11 that form the walls of the openings 10 and 17. A head 19 is formed at one end of each member 18 as an integral part thereof. The members 18 with heads 19, as shown in the drawing, are in the form of through bolts which have the head ends thereof abutting the laminations 4 and the opposite or threaded ends extending from the openings 17 so as to be in position to receive a member to which the core assembly is to be mounted and to receive clamping elements acting in conjunction with the through bolts. The clamping members 18 need not necessarily be limited to the form of through bolts and may consist of any suitable means that is passed through the laminated segments and that functions to maintain the same in position. As an example, a stud or other tension member threaded at both ends may be employed.

As shown in Figs. 2 and 3, the magnetic core 1 is mounted upon a member 25. Spacer washers 20 carried on the through bolts 18 reside between the yoke 3 and the member 25 and lock washers 21 and clamping nuts 22 threaded upon the through bolts 18 are the few fittings required to complete the apparatus. By drawing the nuts 22 up tightly and thereby placing the through bolts 18 under tension the core segments are rigidly positioned and the entire apparatus is mounted in place.

The primary coil 23 and the secondary coil 24 each linked with the magnetic core 1 complete a transformer that has the respective magnetic parts thereof joined together by a simplified means that eliminates multiple bracket parts, or relatively complex bracket forms, that have heretofore been necessary.

It is to be understood that this invention may be utilized in other than a two legged transformer construction as shown in the drawing and that it extends to magnetic cores of varied forms and to magnetic cores which include air gaps within the flux path. In the practice of this invention the clamping members 18 are preferably composed of metallic material for strength considerations and such metallic materials may extend to the use of ferromagnetic substances. It has heretofore been generally held that large metallic members of substantially continuous cross section, such as the members 18, when introduced into a laminated magnetic core would become unduly heated due to eddy-current effects and transformer characteristics would be impaired. It has been found, however, that clamping means of magnetic or non-magnetic metals in the form of the members 18 introduced within the magnetic core as disclosed herein will, contrary to expectation, have operating temperatures below that of the surrounding core and that operating efficiency is not impaired in an average transformer or reactor.

The welds 9 and 16, as shown in the drawing, are positioned in areas having flux densities of relative minimum values and they are further disposed along the outer faces of the core 1. Eddy-current paths which encircle and link the flux paths are not created by this arrangement of the welds, as would occur if the welds were positioned on both the outer and inner core faces.

Apparatus constructed in accordance with this invention provides for the replacement of parts with simplicity and ease. Thus, upon a breakdown of a transformer or reactor coil carried by the magnetic core a removal of the clamping members 18 with an attendant separation of the core segments permits the coil to be readily removed and replaced. Reassembly calls for the single operation of tightening the nuts carried upon the clamping shafts.

I claim:

In a magnetic core assembly the combination comprising a body segment having a pair of parallel spaced leg portions with a medially disposed longitudinal opening in each extending therethrough and a central portion merged with said leg portions at a respective end of each; said body segment comprising a plurality of stacked flat magnetic laminations of uniform perimetrical contour each having a pair of parallel spaced leg portions and a central portion to form a part of the corresponding portions of said body segment with the large face areas of the laminations disposed parallel to said openings, and fused metal welds joining adjacent laminations to one another at the edges thereof; a rectangular yoke segment extending across and abutting against the ends of said leg portions of said body segment opposite the ends merged with said central portion of said body segment to form with said body segment a flux path comprising a substantially closed loop of magnetic material and having a pair of transverse openings extending therethrough in alignment with said openings in said leg portions of said body segment; said yoke segment comprising a plurality of stacked flat uniform rectangular laminations with the large face areas thereof disposed in parallel relation to the openings in said yoke, and fused metal welds joining adjacent laminations to one another at the edges thereof; clamping members extending through each of the aligned sets of openings in said yoke and body segments having the surfaces thereof disposed from the walls of said openings along the entire length of the openings; and fastening means mounted on the ends of said clamping members in abutting relation to the faces of said body segment and said yoke from which said sets of openings enter said body segment and yoke, one of said fastening means on each clamping member being threadedly engaged therewith and being adapted to be brought up to butt said body segment and yoke tightly to one another.

References Cited in the file of this patent

UNITED STATES PATENTS

| | | |
|---|---|---|
| 1,319,181 | Sethman | Oct. 21, 1919 |
| 1,455,199 | Groten | May 15, 1923 |
| 1,546,885 | Burnham | July 21, 1925 |
| 1,550,889 | Doran | Aug. 25, 1925 |
| 1,586,082 | Gilbert | May 25, 1926 |
| 1,988,734 | Helgason | Jan. 22, 1935 |
| 2,393,439 | White et al. | Jan. 22, 1946 |
| 2,456,219 | Shaheen | Dec. 14, 1948 |
| 2,494,180 | Koubek | Jan. 10, 1950 |